United States Patent
Brigham et al.

(10) Patent No.: US 10,728,124 B2
(45) Date of Patent: Jul. 28, 2020

(54) EFFICIENT TIME SERIES DATA COMMUNICATION

(71) Applicant: Aptiv Technologies Limited, St. Michael (BB)

(72) Inventors: Brandon Brigham, Clarkston, MI (US); Keith Nash, Novi, MI (US); Nathan C. Nantais, Windsor (CA); Guanyu Zhou, Canton, MI (US)

(73) Assignee: APTIV TECHNOLOGIES LIMITED, St. Michael (BB)

(*) Notice: Subject to any disclaimer, the term of this patent is extended or adjusted under 35 U.S.C. 154(b) by 156 days.

(21) Appl. No.: 15/913,998

(22) Filed: Mar. 7, 2018

(65) Prior Publication Data

US 2019/0280951 A1 Sep. 12, 2019

(51) Int. Cl.
| | |
|---|---|
| *H04L 12/26* | (2006.01) |
| *H04B 17/10* | (2015.01) |
| *H04L 29/08* | (2006.01) |
| *H04L 12/40* | (2006.01) |

(52) U.S. Cl.
CPC ......... *H04L 43/067* (2013.01); *H04B 17/104* (2015.01); *H04L 12/40169* (2013.01); *H04L 67/12* (2013.01); *H04L 2012/40215* (2013.01); *H04L 2012/40273* (2013.01)

(58) Field of Classification Search
None
See application file for complete search history.

(56) References Cited

U.S. PATENT DOCUMENTS

| | | | |
|---|---|---|---|
| 2009/0300039 A1* | 12/2009 | Stengelin | H03M 7/30 |
| 2016/0188630 A1* | 6/2016 | Pfeifle | G06F 16/2379 |
| | | | 717/169 |
| 2017/0142187 A1* | 5/2017 | Pimentel | H04L 67/06 |

OTHER PUBLICATIONS https://medium.com/@vaclav.loffelmann/the-worlds-first-middle-out-compression-for-time-series-data-part-1-1e5ad5312757; Oct. 2, 2017, 9 pages.
Supriya Kelkar et al: "Control area network based quotient remainder compression-algoritym for automotive applicatiaons", Oct. 25, 2015, pp. 3030-3036.

(Continued)

*Primary Examiner* — Angela Nguyen

(57) ABSTRACT

An illustrative example network monitoring device performs a lossless byte level compression of time series data communicated over the network. The device includes a processor configured to monitor a plurality of communications over the network. For each communication, the device determines whether a message included in the communication was included in a previous communication. When the message was not included in a previous communication, the processor associates a message identifier with the communication, associates a time indicator with the communication, and stores information regarding content of the communication. When the message was included in a previous communication, the device determines a difference in time between the communication and the previous communication and determines any content difference between content of the communication and content of the previous communication. The device stores information for the communication including a time difference indicator and information regarding only the determined content difference.

20 Claims, 3 Drawing Sheets

(56) References Cited

OTHER PUBLICATIONS

Wu Yu-Jing et al: "Efficient controller area network data compression for automobile applications", Dec. 30, 2014, pp. 70-78.
European Search Report for Application No. 19158589, European Patent Office, dated May 3, 2019.

* cited by examiner

EFFICIENT TIME SERIES DATA COMMUNICATION

BACKGROUND

Innovations in electronics and technology have made it possible to incorporate a variety of advanced features on automotive vehicles. Many electronic devices and multiple electronic controllers or processors are typically included on modern vehicles. There are standard communication protocols for such devices to communicate with each other over a vehicle controller area network (CAN).

One issue presented by the proliferation of electronics on vehicles is the necessity to manage the ongoing, time series communications over the vehicle CAN. The industry standard protocol has worked well for on-vehicle communications among the devices. Managing and using the information or data shared over the vehicle CAN for off-vehicle purposes such as analysis, however, is challenging. The vehicle CAN continuously carries data communications among various devices on the vehicle. On average approximately 500 Kilobytes of data is generated every minute. Over time, communicating that volume of such data from the vehicle to a remote location becomes difficult to manage.

Vehicle manufacturers, for example, desire to obtain the CAN data from vehicles for various analyses. The volume of vehicle CAN data and the continuous nature of the communications including such data makes it very difficult to communicate all of the data in an efficient manner from the vehicle CAN to a remote device accessible to appropriate computing devices or personnel. The channel bandwidth and processor occupancy required just for transferring all such data presents significant drawbacks and challenges.

It would be useful to have an efficient way of managing vehicle CAN data that allows for it to be transferred from the vehicle at a relatively low processing and channel bandwidth cost.

SUMMARY

An illustrative example embodiment of a method of managing data included in a plurality of time series communications over a network includes, for each of the communications, determining whether a message included in the communication was included in a previous one of the communications. When the message was not included in a previous one of the communications, the method includes associating a message identifier with the communication, associating a time indicator with the communication, and storing information for the communication in memory. The stored information includes information regarding content of the communication, the associated message identifier and the associated time indicator. When the message was included in a previous one of the communications, the method includes associating the message identifier with the communication, determining a difference in time between the time of the communication and the time of the previous one of the communications, associating a time difference indicator with the communication, determining a content difference between content of the communication and content of the previous one of the communications, and storing information for the communication in the memory. The stored information includes the associated message identifier, the associated time difference indicator and information regarding only the determined content difference.

An illustrative example embodiment of a network monitoring device performs a lossless byte level compression of time series data communicated over the network. The device includes a processor and a memory associated with the processor. The processor is configured to monitor a plurality of communications over the vehicle controller area network. For each of the plurality of communications, the processor determines whether a message included in the communication was included in a previous one of the communications. When the message was not included in a previous one of the communications, the processor associates a message identifier with the communication, associates a time indicator with the communication, and stores information for the communication in the memory. The stored information includes information regarding content of the communication, the associated message identifier and the associated time indicator. When the message was included in a previous one of the communications, the processor associates the message identifier with the communication, determines a difference in time between the time of the communication and a time of the previous one of the communications, associates a time difference indicator with the communication, determines any content difference between content of the communication and content of the previous one of the communications, and stores information for the communication in the memory. The stored information includes the associated message identifier, the associated time difference indicator and information regarding only the determined content difference.

An illustrative example embodiment of a vehicle includes a plurality of electronic devices and a plurality of electronic controllers supported on the vehicle. The electronic controllers and electronic devices communicate with each other over a vehicle controller area network. The vehicle also includes a monitoring device as described in the previous paragraph.

Various features and advantages of at least one disclosed embodiment will become apparent to those skilled in the art from the following detailed description. The drawings that accompany the detailed description can be briefly described as follows.

DETAILED DESCRIPTION

Embodiments of this invention provide the ability to manage time series data communicated over a network, such as that from a vehicle controller area network (CAN), in a way that allows for communicating such information to a location remote from the network. With embodiments of this invention, the communication bandwidth and processing capability or processor occupancy can be reduced, at least in part, because less than all of the time series data can be transferred to the remote location while still having an ability to reconstruct and analyze the entirety of the data at that remote location. Embodiments of this invention include a lossless byte level compression method for time series data, such as that on a vehicle CAN.

Figure 1:
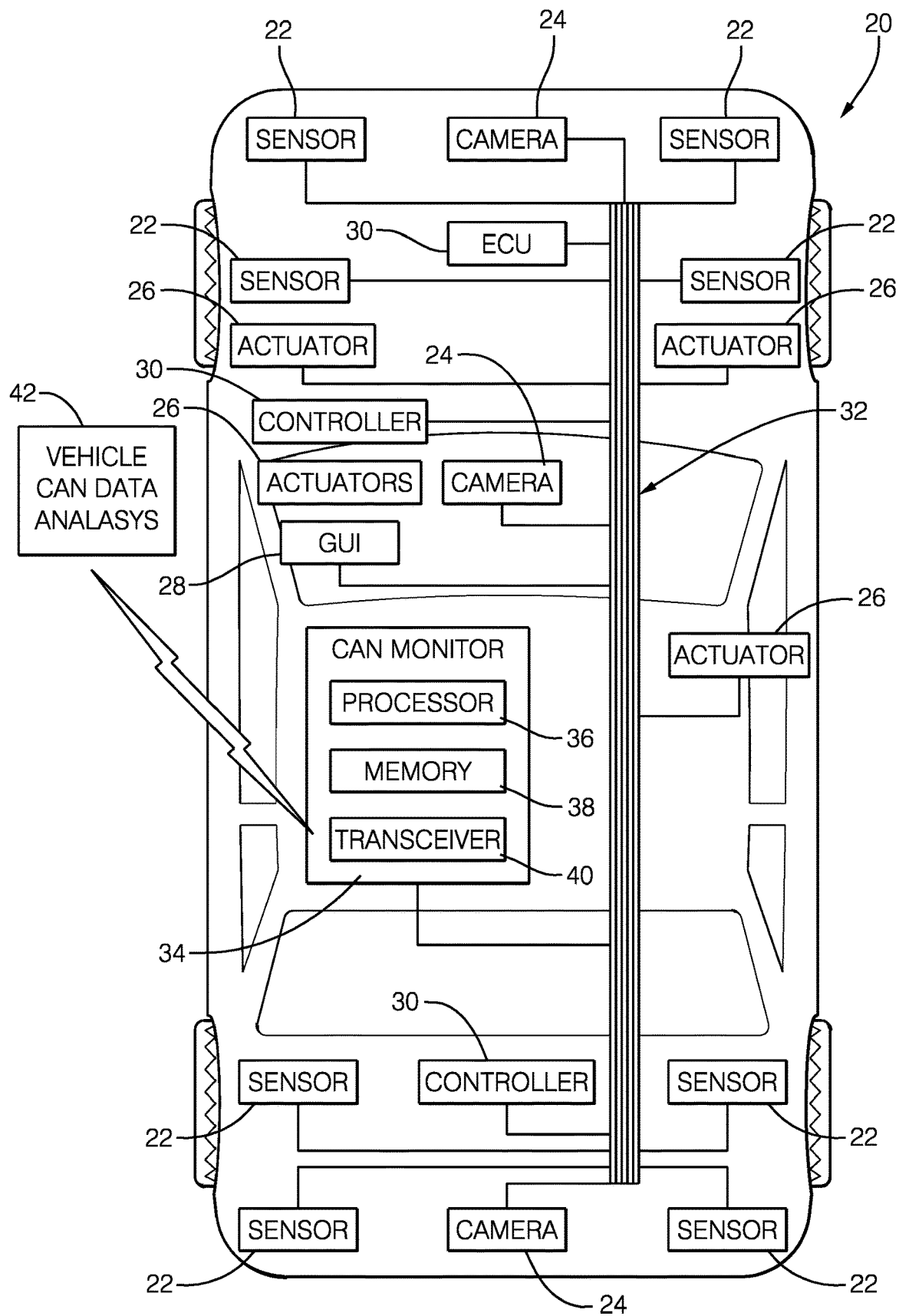
FIG. 1 schematically illustrates a vehicle including a plurality of electronic devices that communicate over a vehicle controller area network and a monitoring device designed according to an embodiment of this invention.

While lossless byte level compression for time series data designed according to an embodiment of this invention is not necessarily limited to use on any particular network configuration a vehicle CAN network is used as an example type of network for discussion purposes. FIG. 1 schematically illustrates a vehicle including a plurality of electronic devices on the vehicle. Example devices include multiple sensors 22, cameras 24, actuators 26 and a graphical user interface 28. Additionally, multiple electronic controllers or processors 30 are supported on the vehicle 20. The various devices and controllers are schematically shown for discussion purposes. Those skilled in the art already have an understanding of the types of electronic devices supported on vehicles.

A vehicle controller area network (CAN) 32 facilitates communications among the various electronic devices and controllers 30. In the illustrated example, such communications over the vehicle CAN 32 utilize a standard CAN protocol. Such communications include, for example, an identifier of a message included in the communication and the data or content of the communication.

A CAN monitoring device 34 monitors the communications over the vehicle CAN 32. The CAN monitoring device 34 includes a processor 36, a memory 38 and a communication module 40. The processor 36 includes at least one computing device that is configured to perform the functions of the CAN monitoring device 34 described in this document. The at least one computing device includes hardware specially configured to perform such functions. The configuration of that hardware may be accomplished through software or firmware, for example. In some implementations, the physical components of the computing device are specially configured to perform the CAN monitoring device functions of this description.

The communication module 40 is capable of at least transmitting or sending information over a wireless communication link to a device, such as a vehicle CAN data analysis device 42 at a location that is remote from the vehicle 20 and the CAN 32. Wireless communication allows for transferring information from the CAN monitoring device 34 to the vehicle CAN data analysis device 42 without requiring any hardwire or mechanical connection to the vehicle 20 and allows for such communication to occur on an ongoing basis. The wireless link can be achieved in a known manner.

Communications over the vehicle CAN 32 occur essentially continuously and may be considered time series data communications. The volume of data involved in such communications over time is significantly large. For example, on average, the CAN 32 will carry about 5000 KB per minute. In some circumstances, a four channel CAN data file may correspond to a data rate of approximately 10 MB per minute. Embodiments of this invention include a lossless byte level compression method that allows for the communications on the vehicle CAN 32 to be monitored, processed, analyzed, or a combination of these at a remote location such as the data analysis device 42 without requiring all of the actual data communicated over the vehicle CAN 32 to be transferred or uploaded from the vehicle 20. In other words, the entire volume of data communicated over the vehicle CAN 32 can be analyzed at a remote location separate from the vehicle without having to transfer all of the actual data from the vehicle to the remote location. The data that is transferred allows for the entire or full stream of data over the CAN to be reconstructed at the remote location.

Figure 2:
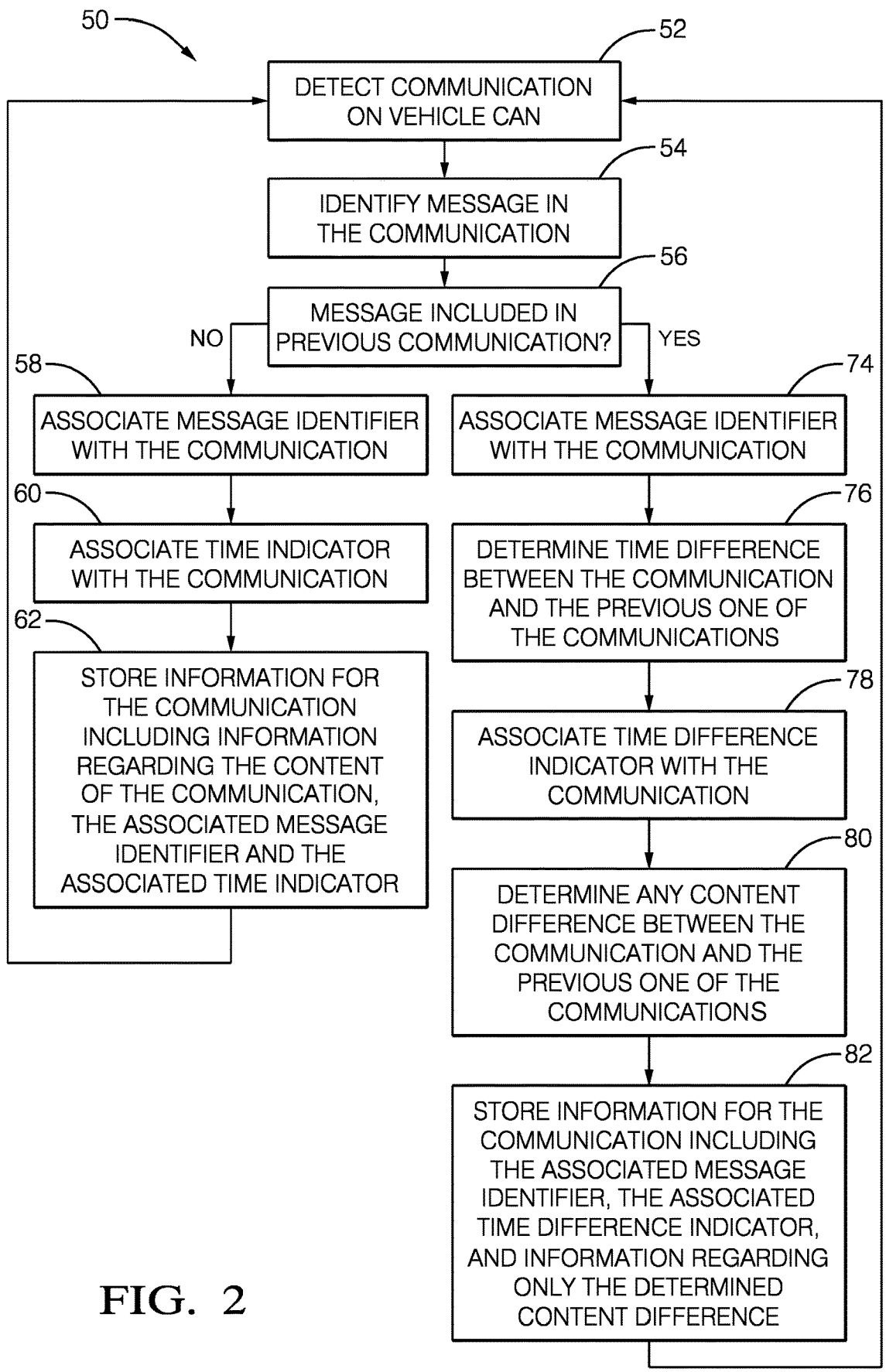
FIG. 2 is a flow chart diagram summarizing an example time series network data management technique designed according to an embodiment of this invention.

FIG. 2 is a flowchart diagram 50 that summarizes an example byte level compression approach to managing time series vehicle CAN data that facilitates communicating such data wirelessly to a location remote from the vehicle 20. At 52, the CAN monitoring device 34 detects a communication on the vehicle CAN 32. At 54, the CAN monitoring device 34 identifies a message included in the communication. The communicating device sending the communication may be any one of the devices schematically shown in FIG. 1, for example. At 56, the CAN monitoring device 34 determines whether the message was included in a previous communication. In some implementations, the CAN monitoring device 34 maintains some record or indication of a previous communication for a predetermined time for purposes of determining whether the message was included in a previous communication. For example, the CAN monitoring device 34 may be programmed to reset all indications of any previous communications for all devices communicating over the vehicle CAN 32 every 24 hours. The interval at which previous communication records can be reset may be customized to suit the needs of a particular implementation. Those skilled in the art who have the benefit of this description will realize whether including a reset interval and how long to make that interval will best meet their particular needs.

When the CAN monitoring device 34 determines that the message was not included in a previous communication, the communication currently being considered is determined to be an initial communication including that message. According to the flowchart 50, the CAN monitoring device 34 associates a message identifier with the communication at 58. The message identifier indicates an identity of the message. Using a standard vehicle CAN protocol, some information identifying a message can be extracted from the communication, itself. The CAN monitoring device 34 in the illustrated example is configured to recognize a device identifier and, in some instances, use that identifier as the identifier while in other implementations assign a different message identifier to each message included in communications over the vehicle CAN 32.

At 60, the CAN monitoring device 34 determines a time at which the communication occurred and associates a time indicator with the communication. The reference point for the time of the communication may be customized to meet the needs of a particular implementation. For example, the time indicator may be associated with or correspond to a time of day. In another embodiment, the time indicator is based on a system clock associated with the vehicle CAN 32.

At 62, the CAN monitoring device 34 stores information in the memory 38 for the communication. The stored information includes information regarding the content of the communication. The content of the communication is the data actually communicated over the vehicle CAN 32 by the devices participating in or involved in that particular communication. The stored information also includes the associated message identifier and the associated time indicator.

Figure 3:
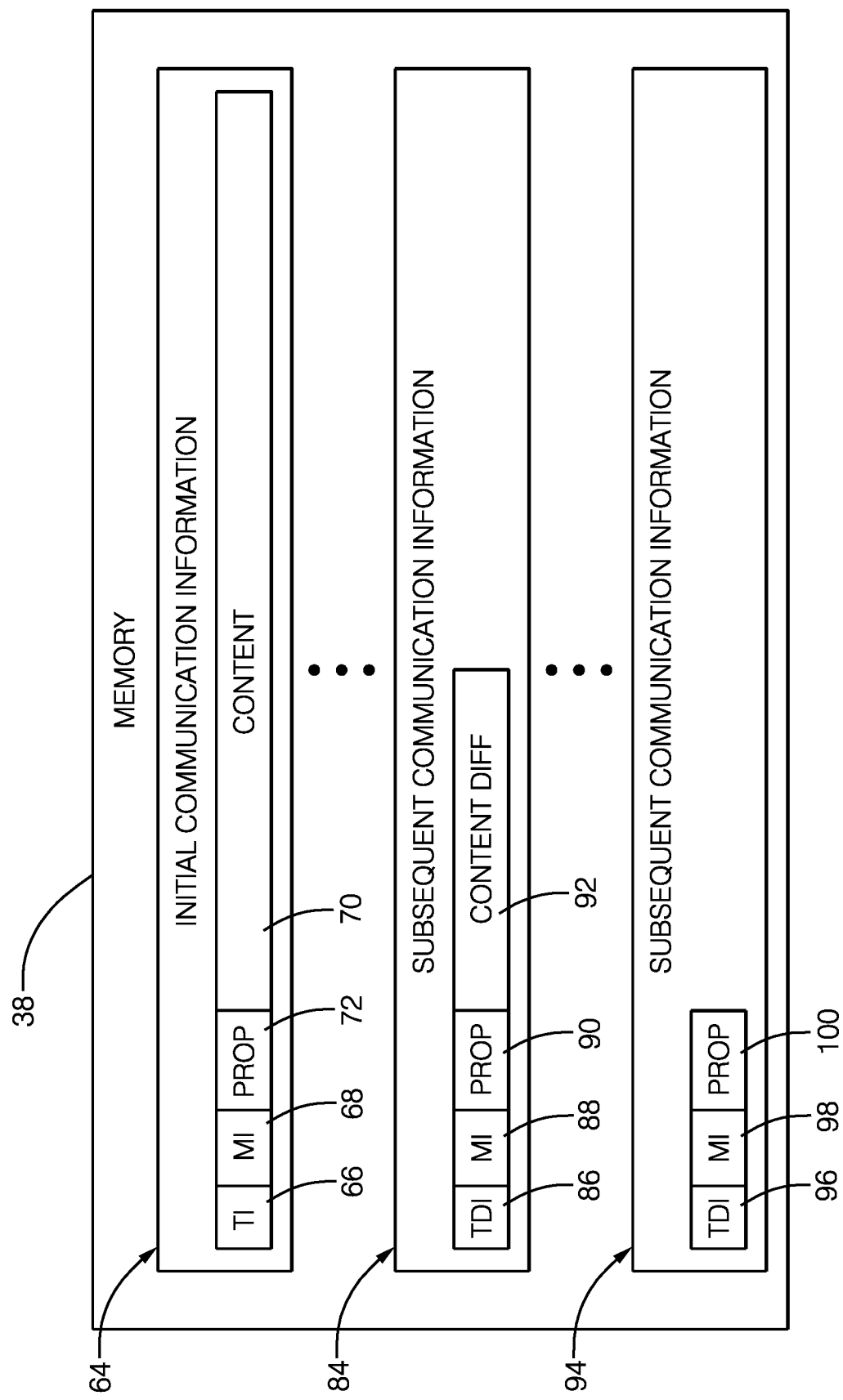
FIG. 3 schematically illustrates selected features of data entries in a memory containing network communication information according to an embodiment of this invention.

Referring to FIG. 3, an example entry in the memory 38 is schematically represented at 64. A time indicator TI is shown at 66, the message indicator MI is shown at 68 and the content of the communication is shown at 70. Property information (PROP) is shown at 72. The property information 72 includes information regarding the communication such as the size of the data file or content 70 and a type of communication, for example. Given this description, those skilled in the art will realize what type of property information would be useful to associate with the content of a communication so that when such information is transferred to a remote location for analysis, a meaningful or useful analysis may be accomplished.

As shown in FIG. 2, when the message was included in a previous communication as determined at 56, the CAN monitoring device 34 associates the message identifier with the communication at 74. At 76, a determination is made regarding a time difference between the communication and the previous one of the communications involving the identified message. For example, it may have been five seconds or five minutes since the last communication involving the same message was detected over the vehicle CAN 32. At 78, the CAN monitoring device 34 associates a time difference indicator, which corresponds to the determined time difference, with the communication.

At 80, the CAN monitoring device 34 determines any content difference between the communication and the previous one of the communications involving the identified message. The content difference will vary depending on the circumstances surrounding the communication currently under consideration. In some instances, a controller onboard a vehicle periodically provides updates over the vehicle CAN 32. In some instances, the update involves only a slight change in data or content compared to a previous or recent communication from that controller. In some cases, the same message is repeated multiple times at scheduled intervals. In such instances, there is possibly no content difference although multiple communications including the same message occur over the vehicle CAN 32. Those interested in analyzing communications over a vehicle CAN may be interested in how often a message is communicated even if the same information is repeated in multiple communications. The CAN monitoring device 34 has the ability to recognize such communications and consider them separate communications from previous communications including the same content as well as being able to distinguish among different communications that have differing content.

At 82, the CAN monitoring device 34 stores information for the communication in the memory 38. The stored information includes the associated message identifier, the associated time difference indicator, and information regarding only the determined content difference. Storing information in this way reduces the amount of data transfer required for purposes of subsequent analysis of the communication that occurred over the vehicle CAN 32. Storing an associated time difference indicator rather than a time indicator (as was done at 60 and 62 for an initial communication), reduces the amount of data required for tracking or determining the time of the communication under consideration in embodiments that include a time difference indicator in a format that requires less data than a full time indicator.

Storing only information regarding the determined content difference rather than storing information regarding the entire content of the communication reduces the amount of memory required and the amount of data that has to be transmitted or communicated from the vehicle 20 to a remote location for analysis. For example, when the previous one of the communications included thirty-two bits of data and the content difference relates to only two of those bits, storing only the determined content difference reduces the amount of data required to be stored and communicated by approximately 85 percent. Of course, the amount of content difference for a given communication will dictate the amount of data and communication bandwidth savings associated with a particular communication.

FIG. 3 schematically shows a subsequent communication entry in the memory 38 at 84. In this example, the time difference indicator (TDI) at 86 may require less data than the time indicator shown at 66. The message indicator 88 in many example embodiments will occupy the same amount of data as the message indicator 68. The property information at 90 in this example includes information allowing a receiving device to interpret how the content difference shown at 92 relates to the content shown at 70 assuming the same message was included in both communications schematically represented in FIG. 3. For example, the property information at 90 may indicate the size of the content data at 70 and the location of the different information that is included in the content difference information at 92. In other words, the property information 90 indicates which portions of the previous communication content 70 changed. The content difference at 92 can be substituted for the changed portions to realize or receive the entire content of the subsequent communication 84.

The property information 90 that allows for relating the content difference information 92 to the content information 70 may be considered interpretation information because it allows for a receiving device to interpret the content difference 92 relative to the content 70 so that the receiving device (or another device associated with it) may effectively recreate or reconstitute the entire content of the communication represented at 84 even though only the content difference information 92 was provided from the CAN monitoring device 34. An entire or full stream of data may be reconstructed even though only content difference information 92 gets transferred as a result of the lossless byte level compression technique.

As schematically shown in FIG. 3, the amount of data required for the information at 84 is substantially less than the amount of data required for the information at 64. FIG. 3 schematically illustrates how utilizing the device and methodology of an embodiment of this invention can substantially reduce the amount of data that has to be communicated from a vehicle or another example network to a remote location to allow for analysis of the content of all communications over a vehicle CAN or other network at that remote location. Without using the device and methodology of an embodiment of this invention, the amount of data required for the initial communication represented at 64 would have to be transmitted from the vehicle 20 to the remote location for every communication over the vehicle CAN 32. With an embodiment of this invention, however, when a substantial number of the communications over the vehicle CAN 32 do not involve much content difference compared to a previous communication including a particular message, a substantial reduction in data communication from the vehicle 20 to the remote location may be realized.

FIG. 3 schematically illustrates another example entry in the memory 38 for another communication at 94. In this example, the time difference indicator 96 provides information regarding a difference in time between when the communication shown at 94 occurred and the previous one of the communications at 64 occurred. In this example, the time difference indicator 96 relates back to an initial communication including the message having the associated message identifier. In another example embodiment, the time difference indicator 96 relates back to a most recent previous communication including the same message. Whether to relate time difference indicators back to an initial communication including a particular message or to relate them back to a most recent communication including that message may be selected by those skilled in the art who have the benefit of this description to meet their particular needs.

The communication schematically represented at 94 does not have any content difference compared to the previous one of the communications including the same message. This represents an instance in which a message is repeated over the vehicle CAN 32. Including such communications in the information provided by the CAN monitoring device 34 allows for analytics of the vehicle CAN 32 to include determinations regarding the frequency of such communications by devices whose message content does not change during at least some time intervals. Given that the communication content has not changed, the amount of data required for transmitting information regarding the communication schematically shown at 94 is substantially less than that shown at 64 and less than that shown at 84.

The stored information for the communication at 94 includes a time difference indicator 96 and a message indicator 98. Formatting the time indicator 66 and time difference indicators 86 and 96 may be accomplished in different ways depending on the preferences of the designer of an embodiment of this invention. Those skilled in the art who have the benefit of this description will realize how to format such information to realize a savings in the amount of data that has to be communicated from the vehicle to a remote location. The same applies to the message identifier information shown at 68, 88 and 98.

The stored information at 94 includes property information 100, which in this instance provides an indication that there is no content difference. The property information shown at 72, 90 and 100 may be customized by those skilled in the art who have the benefit of this description and desire to minimize the number of data bits that must be communicated from the vehicle for purposes of allowing for adequate analysis of the communications over the vehicle CAN 32 at the remote location.

Because the CAN monitoring device 34 recognizes an initial communication including a message and then only has to store the content difference and time difference for subsequent communications including that message, the CAN monitoring device 34 can obtain and store information regarding communications over the vehicle CAN 32 at a microsecond time resolution. Additionally, the CAN monitoring device 34 has the capability to effectively compress the information in the communications over the vehicle CAN 32 in real time and on an ongoing basis. In this way, the compression accomplished by the CAN monitoring device 34 differs from most compression techniques. Known data compression techniques are applied to a fixed data set. The compression accomplished by the CAN monitoring device 34, on the other hand, is utilized for an ongoing stream of communication data occurring over the vehicle CAN 32. In other words, there is not a fixed set amount of data before the CAN monitoring device 34 applies the compression technique described above. The combination of the time information, the message identifier information, the content difference information, and the property or interpretation information minimizes the overhead and bandwidth required for transmitting information regarding all communications over the vehicle CAN 32 from the vehicle to a remote location where those CAN communications may be analyzed as if the entire content of all of the communications over the vehicle CAN 32 were transferred to the remote location.

In some embodiments, the CAN monitoring device 34 determines whether the time difference (determined at 76 in FIG. 2, for example) since a most recent communication including the message included in a communication under consideration exceeds a preselected threshold. If such a threshold is exceeded, the CAN monitoring device 34 considers the communication currently under consideration as an initial communication including that message.

In some embodiments, the CAN monitoring device 34 considers an amount of difference in the content difference between a communication and a previous one of the communications involving the same message. If the content difference exceeds a preselected threshold, there may be effectively no savings in the amount of data that has to be transmitted from the vehicle 20 to a remote location. Under such circumstances in some embodiments, the CAN monitoring device 34 determines when the content difference exceeds such a threshold and stores information for that communication as if it were an initial communication including that message. In other words, when a subsequent communication including a message is substantially different than a previous one of the communications by that message, it may be more efficient to store the actual content of the subsequent communication and treat it as if it were a new, initial communication rather than requiring the processing needed at the remote location for relating the content difference to the content of the previous one of the communications.

Embodiments of this invention allow for reducing the volume of data transferred from a network, such as a CAN onboard a vehicle, to a remote location to allow for all communications over that network to be monitored or analyzed at the remote location. It is possible to monitor, process or analyze the entire volume of the communications over a vehicle CAN at a location remote from the vehicle, for example, without having to transfer the entire volume of those communications to the remote location.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A method of managing data included in a plurality of communications over a network, the method comprising:
   for each of the plurality of communications, determining whether a message included in the communication was included in a previous one of the communications; and
   when the message was not included in a previous one of the communications:
   associating a message identifier with the communication, the message identifier being indicative of an identity of the message;
   associating a time indicator with the communication, the time indicator being indicative of a time of the communication; and
   storing information for the communication, the information including information regarding content of the communication, the associated message identifier and the associated time indicator;
   or
   when the message was included in a previous one of the communications:
   associating the message identifier with the communication;
   determining a difference in time between a time of the communication and a time of the previous one of the communications;
   associating a time difference indicator with the communication, the time difference indicator being indicative of a difference in the time of the communication and the time of the previous one of the communications;

determining any content difference between content of the communication and content of the previous one of the communications; and storing information for the communication, the stored information including the associated message identifier, the associated time difference indicator and information regarding only the determined content difference.

2. The method of claim 1, comprising transmitting the stored information for each of the plurality of communications to a device remote from the network.

3. The method of claim 1, wherein the storing information for the communication when the message was included in a previous one of the communications includes storing interpretation information indicating how the information regarding only the determined content difference is related to the content of the previous one of the communications.

4. The method of claim 3, wherein the interpretation information indicates a location within the content of the previous one of the communications for the determined content difference.

5. The method of claim 1, wherein the plurality of communications are ongoing and the method includes performing the determining, the associating and the storing for each of the communications in real time.

6. A vehicle controller area network monitoring device, comprising a processor and memory associated with the processor, the processor being configured to monitor a plurality of communications over the vehicle controller area network and for each of the plurality of communications, the processor determines whether a message included in the communication was included in a previous one of the communications; and when the message was not included in a previous one of the communications:

associates a message identifier with the communication, the message identifier being indicative of an identity of the message;

associates a time indicator with the communication, the time indicator being indicative of a time of the communication; and stores information for the communication in the memory, the information including information regarding content of the communication, the associated message identifier and the associated time indicator;

or when the message was included in a previous one of the communications:

associates the message identifier with the communication;

determines a difference in time between a time of the communication and a time of the previous one of the communications;

associates a time difference indicator with the communication, the time difference indicator being indicative of a difference in the time of the communication and the time of the previous one of the communications;

determines any content difference between content of the communication and content of the previous one of the communications; and stores information for the communication in the memory, the stored information including the associated message identifier, the associated time difference indicator and information regarding only the determined content difference.

7. The device of claim 6, comprising a transmitter and wherein the processor is configured to cause the transmitter to transmit the stored information for each of the plurality of communications to a device remote from the vehicle controller area network.

8. The device of claim 6, wherein the stored information for each communication when the message was included in a previous one of the communications includes interpretation information indicating how the information regarding only the determined content difference is related to the content of the previous one of the communications.

9. The device of claim 8, wherein the interpretation information indicates a location within the content of the previous one of the communications for the determined content difference.

10. The device of claim 6, wherein the message identifier and the content of the communication are extracted from the vehicle controller area network.

11. The device of claim 10, wherein the processor determines a time of the communication and generates the associated time indicator or the associated time difference indicator based on the determined time of the communication.

12. The device of claim 6, wherein the stored information for each communication when the message was not included in a previous one of the communications is initial communication information;

the stored information for each communication when the message was included in a previous one of the communications is subsequent communication information; and the initial communication information occupies more of the memory than the subsequent communication information.

13. The device of claim 12, wherein the initial communication information occupies a first capacity of the memory;

the subsequent communication information occupies a second capacity of the memory; and the second capacity is one-half as large as the first capacity.

14. The device of claim 6, wherein the stored information for each communication when the message was included in a previous one of the communications includes associated relationship information indicative of a relationship between the stored information for the communication and stored information for the previous one of the communications; and the stored information for the communication, the associated interpretation information, and the stored information for the previous one of the communications together allow for determining the actual content of each communication when the message was included in a previous one of the communications.

15. The device of claim 6, wherein the plurality of communications are ongoing; and for each of the communications, the processor determines whether the message was included in a previous one of the communications, associates the message identifier with the communication, associates the time indicator or the time difference indicator with the communication, and stores the information for the communication in the memory, in real time.

16. A vehicle, comprising:
a plurality of communicating devices supported on the vehicle;
a vehicle controller area network supported on the vehicle, the plurality of electronic controllers and the plurality of electronic devices communicating with each other over the vehicle controller area network;
a memory; and
a monitoring device that monitors a plurality of communications on the vehicle controller area network, for each of the plurality of communications, the monitoring device
determines whether a message included in the communication was included in a previous one of the communications; and
when the message was not included in a previous one of the communications:
associates a message identifier with the communication, the message identifier being indicative of an identity of the message;
associates a time indicator with the communication, the time indicator being indicative of a time of the communication; and
stores information for the communication in the memory, the information including information regarding content of the communication, the associated message identifier and the associated time indicator;
or
when the message was included in a previous one of the communications:
associates the message identifier with the communication;
determines a difference in time between a time of the communication and a time of the previous one of the communications;
associates a time difference indicator with the communication, the time difference indicator being indicative of a difference in the time of the communication and the time of the previous one of the communications;
determines any content difference between content of the communication and content of the previous one of the communications; and
stores information for the communication in the memory, the stored information including the associated message identifier, the associated time difference indicator and information regarding only the determined content difference.

17. The vehicle of claim 16, comprising a transmitter and wherein the monitoring device is configured to cause the transmitter to transmit the stored information for each of the plurality of communications to a device remote from the vehicle controller area network.

18. The vehicle of claim 16, wherein the stored information for each communication when the message was included in a previous one of the communications includes interpretation information indicating how the information regarding only the determined content difference is related to the content of the previous one of the communications.

19. The vehicle of claim 18, wherein the interpretation information indicates a location within the content of the previous one of the communications for the determined content difference.

20. The vehicle of claim 16, wherein
the plurality of communications are ongoing; and
for each of the communications, the monitoring device determines whether the message was included in a previous one of the communications, associates the message identifier with the communication, associates the time indicator or the time difference indicator with the communication, and stores the information for the communication in the memory, in real time.

* * * * *